United States Patent
Jung et al.

(10) Patent No.: US 9,153,192 B2
(45) Date of Patent: Oct. 6, 2015

(54) DISPLAY DEVICE

(71) Applicant: LG Display Co., Ltd., Seoul (KR)

(72) Inventors: Ki Moon Jung, Paju-si (KR); Chang Ho Oh, Seoul (KR); Shinji Takasugi, Paju-si (KR)

(73) Assignee: LG Display Co., Ltd, Seoul (KR)

(*) Notice: Subject to any disclaimer, the term of this patent is extended or adjusted under 35 U.S.C. 154(b) by 6 days.

(21) Appl. No.: 14/137,577

(22) Filed: Dec. 20, 2013

(65) Prior Publication Data

US 2014/0185169 A1     Jul. 3, 2014

(30) Foreign Application Priority Data

Dec. 28, 2012  (KR) .......................... 10-2012-0157318

(51) Int. Cl.
*G02F 1/1333*     (2006.01)
*G09G 3/36*       (2006.01)
*G02F 1/1362*     (2006.01)
*G09G 3/32*       (2006.01)

(52) U.S. Cl.
CPC ........ *G09G 3/3685* (2013.01); *G02F 1/136204* (2013.01); *G09G 3/3275* (2013.01); *G09G 2330/04* (2013.01)

(58) Field of Classification Search
CPC .................................................. G02F 1/136204
USPC ........................................................... 349/40
See application file for complete search history.

(56) References Cited

U.S. PATENT DOCUMENTS 5,671,026 A * 9/1997 Shiraki et al. .................. 349/40
5,852,480 A * 12/1998 Yajima et al. .................. 349/40
6,081,307 A * 6/2000 Ha .................................. 349/40

* cited by examiner

Primary Examiner — Thanh-Nhan P Nguyen
(74) Attorney, Agent, or Firm — Fenwick & West LLP (57) ABSTRACT

Disclosed is a display device. The display device includes a panel in which a plurality of pixels are respectively formed in a plurality of pixel areas defined by intersections between a plurality of gate lines and a plurality of data lines, a source driving IC coupled to the plurality of data lines in a first non-display area of the panel and configured to respectively supply data voltages to the plurality of data lines, and an ESD circuit in which, to prevent static electricity from flowing into the plurality of data lines, in the first non-display area, a end of one side of the ESD circuit is coupled to a corresponding data line, a end of the other side is coupled to a power line, and a length of a channel through which a current flows is formed greater than a width of the channel.

8 Claims, 8 Drawing Sheets

FIG. 1

Related Art

FIG. 2

Related Art

DISPLAY DEVICE

CROSS-REFERENCE TO RELATED APPLICATIONS

This application claims the benefit of the Korean Patent Application No. 10-2012-0157318 filed on Dec. 28, 2012, which is hereby incorporated by reference as if fully set forth herein.

BACKGROUND

1. Field of the Invention

The present invention relates to a display device, and more particularly, to a display device that can respond to occurrence of static electricity.

2. Discussion of the Related Art

With the advance of various portable electronic devices such as mobile communication terminals, smart phones, tablet computers, notebook computers, etc., the demand for flat panel display (FPD) devices applicable to the portable electronic devices is increasing. Liquid crystal display (LCD) devices, plasma display panels (PDPs), field emission display (FED) devices, organic light emitting display devices, etc. are being actively researched as the FPD devices.

In such FPD devices, the application fields of liquid crystal display (LCD) devices are being expanded due to advanced manufacturing technology, an easily driven driver, a high-quality image, and a large screen.

Moreover, in such FPD devices, the organic light emitting display devices have a fast response time of 1 ms or less and low power consumption, and have no limitation in a viewing angle because the organic light emitting display devices self-emit light. Accordingly, the organic light emitting display devices are attracting much attention as next generation FPD devices.

Figure 1:
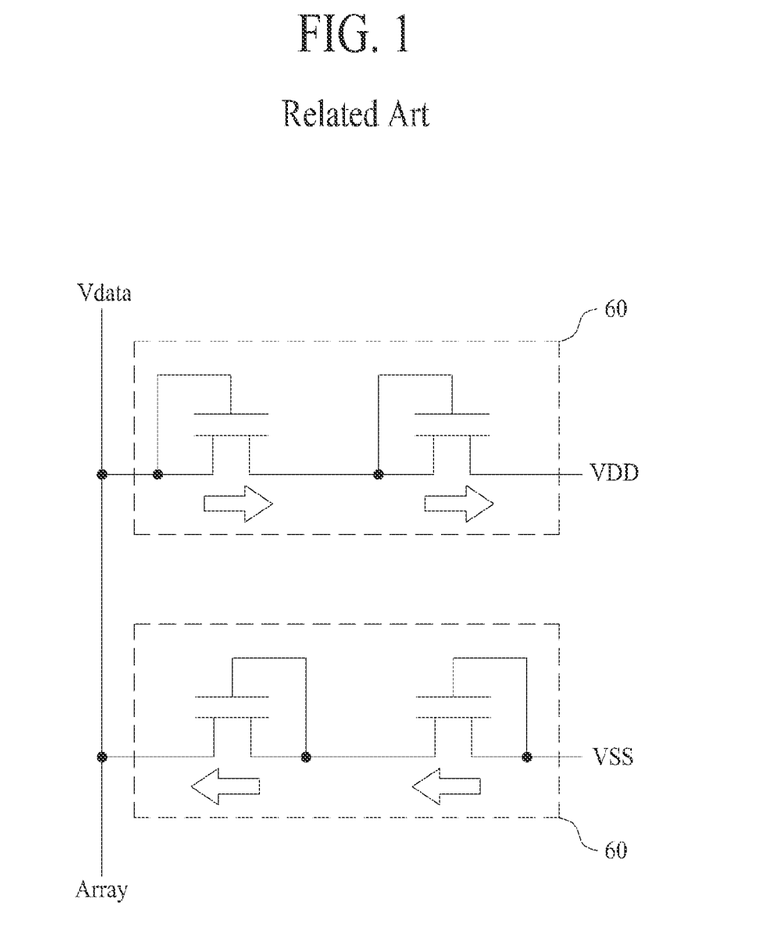
FIG. 1 is a diagram illustrating a configuration of an electrostatic discharge (ESD) circuit included in a related art display device.
Figure 2:
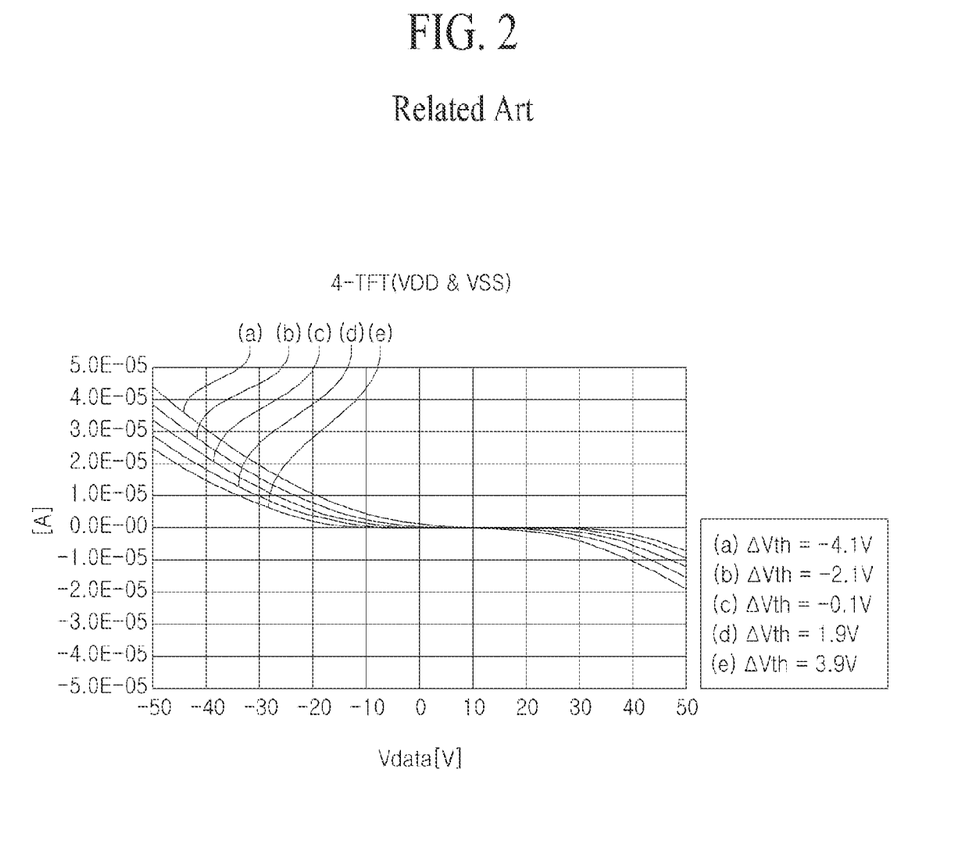
FIG. 2 is a graph showing an electrical characteristic of a thin film transistor (TFT) configuring the ESD circuit included in the related art display device.

FIG. 1 is a diagram illustrating a configuration of an electrostatic discharge (ESD) circuit 60 included in a related art display device, and FIG. 2 is a graph showing an electrical characteristic of a thin film transistor (TFT) configuring the ESD circuit 60 included in the related art display device.

The above-described FPD device (hereinafter simply referred to as a display device) includes a panel that includes a display area displaying an image and a non-display area formed outside the display area, a source driving integrated circuit (IC) that respectively supplies data voltages to a plurality of data lines formed in the display area, and a gate driving IC that supplies a scan signal to a plurality of gate lines formed in the display area.

Generally, static electricity occurs in electronic devices.

Therefore, as illustrated in FIG. 1, display devices include the ESD circuit 60 that prevents static electricity from occurring or prevents a damage caused by the static electricity.

The ESD circuit 60 extends from the source driving IC, and is coupled to a corresponding data line, formed in the display area, through a first non-display area. The ESD circuit 60 is provided in the first non-display area.

An end of one side of the ESD circuit 60 is coupled to a corresponding data line in the first non-display area in which the source driving IC is coupled to the panel, and as illustrated in FIG. 1, an end of the other side is coupled to a high-level driving voltage VDD terminal or a low-level driving voltage VSS terminal, or is coupled to a gate high voltage terminal (through which a gate high voltage VGH is supplied) or a gate low voltage terminal (through which a gate low voltage VGL is supplied)

The ESD circuit 60 is coupled between high voltage terminals (VDD and VSS) or low voltage terminals (VSS and VGL) and a corresponding data line which are formed in a display device such as an LCD device or an organic light emitting display device.

Therefore, when a voltage (static electricity) greater than a normal operation range is induced in the data line, among a plurality of the ESD circuits 60 illustrated in FIG. 1, the ESD circuit 60 which is coupled to the high-level driving voltage VDD terminal is turned on with the static electricity. Therefore, the high-voltage static electricity induced in the data line flows toward the high-level driving voltage VDD terminal, and thus, a data voltage Vdata applied to the data line is reduced to a normal state.

On the other hand, when a voltage (static electricity) less than a normal operation range is induced in the data line, among a plurality of the ESD circuits 60 illustrated in FIG. 1, the ESD circuit 60 which is coupled to the low-level driving voltage VSS terminal is turned on with the static electricity. Therefore, a current flows from the low-level driving voltage VSS terminal to the data line, and thus, the data voltage Vdata applied to the data line is increased to the normal state.

The ESD circuits 60 may be provided in a second non-display area facing the first non-display area, in addition to an upper end of the panel, namely, the first non-display area. That is, the ESD circuits 60 are respectively provided at the upper end and a lower end of the panel, and prevent a high voltage and a low voltage, which are generated from the static electricity, from being applied to the data line.

Each of the ESD circuits 60, as illustrated in FIG. 1, includes a TFT. When the ESD circuit 60 is used for a long time, the TFT is deteriorated, and for this reason, a threshold voltage Vth of the TFT is shifted.

That is, when the ESD circuit 60 is used for a long time, as shown in FIG. 2, the threshold voltage Vth of the TFT is shifted in a negative (−) direction, and for this reason, a leakage current occurs in the TFT.

For example, the TFT is formed in the display device, and in a case where the threshold voltage Vth for when the TFT starts to be driven is 3.9 V (see a graph (e) of FIG. 2), despite the data voltage Vdata of −10 V, a leakage current hardly flows in the TFT.

However, as the display device and the TFT are used for a long time, the threshold voltage Vth of the TFT shifts to −4.1 V (see curve (a) of FIG. 2) due to deterioration of the TFT. In this case, it can be seen that when the data voltage Vdata is −10 V, a leakage current of about 0.05E-05 flows in the TFT.

That is, in the related art display device, as the display device is used for a long time, the TFT configuring the ESD circuit 60 is deteriorated, and thus, the threshold voltage Vth of the TFT is shifted in the negative (−) direction. For this reason, even when a normal data voltage instead of static electricity flows to the data line, a leakage current flows through the ESD circuit 60.

Therefore, even in a normal state where static electricity does not occur, an amount of current applied to the data line is reduced, and thus, the panel cannot display an image having normal luminance, causing a degradation in a quality of the image.

Moreover, as described above, in the normal state, when a leakage current occurs in the ESD circuit 60, a normal current which flows to the data line formed in the display area is reduced. For this reason, a higher data voltage Vdata is applied to the data line, causing an increase in power consumption of the source driving IC.

SUMMARY

Accordingly, the present invention is directed to a display device that substantially obviates one or more problems due to limitations and disadvantages of the related art.

An aspect of the present invention is directed to a display device that increases a resistance value of a TFT formed in an ESD circuit, thus preventing a leakage current from flowing through the TFT in a normal state where static electricity does not occur.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a panel in which a plurality of pixels are respectively formed in a plurality of pixel areas defined by intersections between a plurality of gate lines and a plurality of data lines; a source driving IC coupled to the plurality of data lines in a first non-display area of the panel, and configured to respectively supply data voltages to the plurality of data lines; and an ESD circuit in which, to prevent static electricity from flowing into the plurality of data lines, in the first non-display area, a end of one side of the ESD circuit is coupled to a corresponding data line, an end of the other side is coupled to a power line, and a length of a channel through which a current flows is formed greater than a width of the channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

The present invention may be applied to LCD devices in addition to organic light emitting display devices. That is, the present invention may be applied to all display devices requiring an ESD circuit. Hereinafter, however, for convenience of description, an organic light emitting display device will be described as an example of the present invention.

Figure 3:
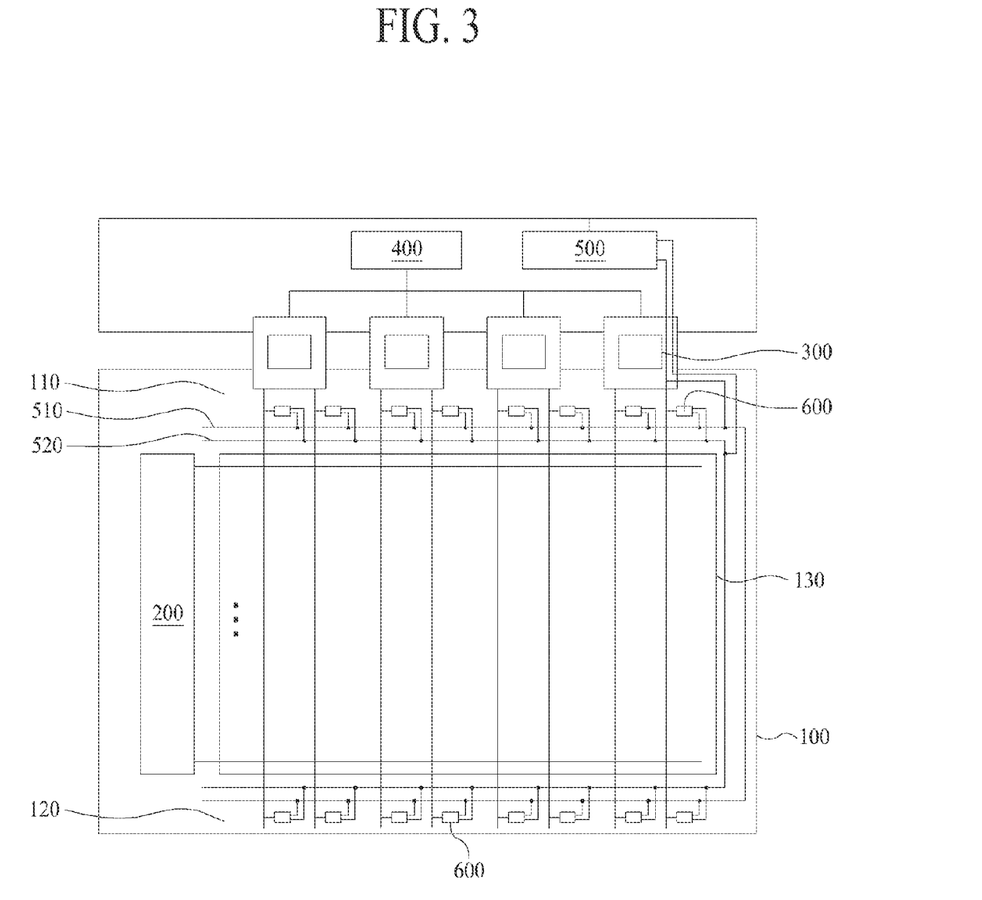
FIG. 3 is a diagram schematically illustrating a display device according to the present invention.
Figure 4:
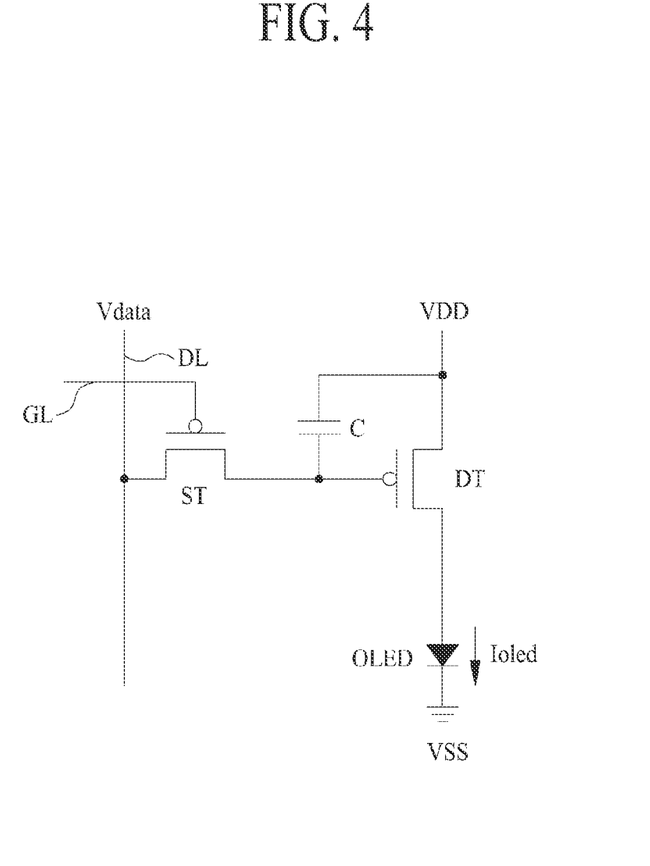
FIG. 4 is an exemplary diagram schematically illustrating a pixel circuit applied to an organic light emitting display device of FIG. 3.

FIG. 3 is a diagram schematically illustrating a display device according to the present invention, and FIG. 4 is an exemplary diagram schematically illustrating a pixel circuit applied to an organic light emitting display device of FIG. 3.

The present invention relates to a display device that increases a resistance value of a TFT formed in an ESD circuit, thus preventing a leakage current from flowing through the TFT in a normal state where static electricity does not occur. According to the present invention, a current which is applied from a source driving IC to a panel through a data line is not leaked.

To this end, as illustrated in FIG. 3, the display device according to the present invention includes: a panel 100 that includes a plurality of pixels, which are respectively formed in a plurality of pixel areas defined by intersections between a plurality of gate lines GL1 to GLn and a plurality of data lines DL1 to DLm, and a plurality of power lines 510 and 520 which are formed for supplying power necessary for an organic light emitting element formed in each of the plurality of pixels; a gate driving IC 200 that supplies a scan signal to the gate lines GL1 to GLn; a source driving IC 300 that is coupled to the data lines DL1 to DLm in a first non-display area of the panel 100, and supplies data voltages to the data lines DL1 to DLm; an ESD circuit 600 in which, in order to prevent static electricity from flowing into the data lines DL1 to DLm, in the first non-display area, an end of one side of the ESD circuit 600 is coupled to a corresponding data line, an end of the other side is coupled to the power lines 510 and 520, and a length of a channel through which a current flows is formed greater than a width of the channel; a power supply 500 that supplies power to the power lines 510 and 520; and a timing controller 400 that controls the gate driving IC 200 and the source driving IC 300.

The plurality of pixels are respectively formed in the plurality of pixel areas defined by intersections between the plurality of gate lines GL1 to GLn and the plurality of data lines DL1 to DLm, and a pixel circuit is included in each of the plurality of pixels.

The pixel circuit, as illustrated in FIG. 4, includes a switching transistor ST, a driving transistor DT, a capacitor C, and an organic light emitting element OLED.

The switching transistor ST is turned on according to the scan signal supplied through a corresponding gate line GL, and transfers a data voltage Vdata, supplied through a corresponding data line DL, to the driving transistor DT.

The driving transistor DT is turned on with the data voltage Vdata supplied through the switching transistor ST, and controls a current flowing from a high-level driving voltage VDD terminal to the organic light emitting element OLED.

The capacitor C is coupled between a gate and a source of the driving transistor DT, stores a voltage corresponding to the data voltage supplied to the gate of the driving transistor DT, and turns on the driving transistor DT with the stored voltage.

The organic light emitting element OLED is electrically coupled between a drain of the driving transistor DT and a low-level driving voltage VSS terminal, and emits light with a current supplied from the driving transistor DT. Here, the current flowing in the organic light emitting element OLED is determined according to a gate-source voltage of the driving transistor DT, a threshold voltage of the driving transistor DT, and the data voltage.

The pixel circuit controls a level of a current Ioled flowing from the high-level driving voltage VDD terminal to the organic light emitting element OLED by using a switching time of the driving transistor DT based on the data voltage Vdata, and emits light from the organic light emitting element OLED, thereby displaying an image.

The panel 100 includes a display area 130 displaying an image and a plurality of non-display areas 110 and 120 formed outside the display area 130. The power lines 510 and 520, such as a high-level voltage line for supplying the high-level driving voltage VDD to the organic light emitting element OLED, a low-level voltage line for supplying the low-level driving voltage VSS to the organic light emitting element OLED, a reference voltage line (not shown) for supplying a reference voltage Vref used to drive the organic light emitting element OLED to a corresponding pixel, a gate high voltage VGH line, a gate low voltage VGL line, and a ground voltage line, are formed in the display area 130 and the non-display areas 110 and 120. In FIG. 3, the power lines formed in the display area 130 is not illustrated.

The voltages VDD, VSS, VGH, VGL and Vref and the ground voltage are supplied to the gate driving IC 200 and the pixels formed in the display area 130, and are coupled to the power supply 500 through the power lines 510 and 520.

To provide an additional description, each of the power lines 510 and 520 supplies one of the high-level driving voltage VDD, the low-level driving voltage VSS, the reference voltage Vref, the gate high voltage VGH, the gate low voltage VGL, and the ground voltage to the panel 100, and is coupled to the power supply 500. The power supply 500 includes a ground terminal.

The gate driving IC 200 sequentially supplies a gate-on signal to the gate lines by using gate control signals GCS generated by the timing controller 400.

Here, the gate-on signal denotes a voltage that turns on a plurality of switching TFTs respectively coupled to the gate lines. A voltage for turning off the switching TFTs is referred to as a gate-off signal. A generic name for the gate-on signal and the gate-off signal is referred to as a scan signal.

When the switching TFT is an N-type TFT, the gate-on signal is a high-level voltage, and the gate-off signal is a low-level voltage. When the switching TFT is a P-type TFT, the gate-on signal is a low-level voltage, and the gate-off signal is a high-level voltage.

The gate driving IC 200 may be provided independent from the panel 100, and may be coupled to the panel 100 through a tape carrier package (TCP) or a flexible printed circuit board (FPCB). However, as illustrated in FIG. 3, the gate driving IC 200 may be provided as a gate-in panel (GIP) type which is mounted on the panel 100.

The source driving IC 300 converts digital image data, transferred from the timing controller 400, into data voltages, and respectively supplies the data voltages for one horizontal line to the data lines DL at every one horizontal period in which the scan signal is supplied to one gate line. That is, the source driving IC 300 is coupled to the data lines DL in the first non-display area 110 of the panel 100, and respectively supplies the data voltages to the data lines DL.

The source driving IC 300, as illustrated in FIG. 3, may be coupled to the panel 100 in a chip-on film (COF) type, or may be directly mounted on the panel 100. The number of source driving ICs 300 may be variously set according to a size, a resolution, etc. of the panel 100.

The source driving IC 300 converts the image data into the data voltages by using gamma voltages supplied from a gamma voltage generator (not shown), and respectively outputs the data voltages to the data lines. To this end, the source driving IC 300 includes a shift register, a latch, a digital-to-analog converter (DAC), and an output buffer.

The shift register outputs a sampling signal by using data control signals (SSC, SSP, etc.) received from the timing controller 400.

The latch latches the digital image data sequentially received from the timing controller 400, and then simultaneously outputs the latched image data to the DAC 330.

The DAC simultaneously converts the image data, transferred from the latch, into positive or negative data voltages, and outputs the positive or negative data voltages. That is, the DAC converts the image data into the positive or negative data voltages according to a polarity control signal transferred from the timing controller 400 by using the gamma voltages supplied from the gamma voltage generator (not shown), and respectively outputs the positive or negative data voltages to the data lines.

The output buffer respectively outputs the positive or negative data voltages, transferred from the DAC, to the data lines DL of the panel 100 according to a source output enable signal SOE transferred from the timing controller 400.

The power supply 500 supplies power to the power lines 510 and 520.

As described above, the high-level voltage VDD and the low-level voltage VSS are supplied to the organic light emitting element OLED through a high-level voltage line 510 and a low-level voltage line 520 which are respectively coupled to an anode and a cathode of the organic light emitting element OLED. The reference voltage Vref is supplied to the pixel circuit included in each pixel through the reference voltage line. Also, the reference voltage Vref required by the pixel circuit is transferred to a corresponding pixel, and the gate high voltage VGH and the gate low voltage VGL may be supplied to the gate driving IC 200, and may be used to generate the scan signal.

The power supply 500 generates the above-described voltages, and supplies the voltages to the power lines 510 and 520.

The timing controller 400 generates a gate control signal GCS used to control an operation timing of the gate driving IC 200 and a data control signal DCS used to control an operation timing of the source driving IC 300 by using a timing signal (i.e., a vertical sync signal Vsync, a horizontal sync signal Hsync, and a data enable signal DE) input from an external system (not shown), and converts, video data input from the external system, into image data to be transferred to the source driving IC 300.

To this end, the timing controller 400 includes: a receiver that receives input video data and timing signals from the external system; a control signal generator that generates various control signals; a data aligner that realigns the input video data to output realigned image data; and an output unit that outputs the control signals and the image data.

That is, the timing controller 400 realigns the input video data input from the external system so as to match a structure and a characteristic of the panel 100, and transfers the realigned image data to the source driving IC 300. Such a function may be performed by the data aligner.

The timing controller 400 generates the data control signal DCS used to control the source driving IC 300 and the gate control signal GCS used to control the gate driving IC 200 by using the timing signals (i.e., the vertical sync signal Vsync, the horizontal sync signal Hsync, and the data enable signal DE, etc.) transferred from the external system, and respectively transfers the control signals to the source driving IC 300 and the gate driving IC 200. Such a function may be performed by the control signal generator.

A plurality of the data control signals generated by the control signal generator may include a source start pulse SSP, a source shift clock signal SSC, a source output enable signal SOE, and a polarity control signal POL.

A plurality of the gate control signals GCS generated by the control signal generator may include a gate start pulse GSP, a gate start signal VST, a gate shift clock GCS, a gate output enable signal GOE, and a gate clock GCLK.

In the ESD circuit 600, in order to prevent static electricity from flowing into the data lines DL1 to DLm, in the first non-display area, a end of one side of the ESD circuit 600 is coupled to a corresponding data line, a end of the other side is coupled to the power lines 510 and 520, and a length of a channel through which a current flows is formed greater than a width of the channel The ESD circuit 600, as illustrated in FIG. 3, is provided in correspondence with each of the data lines DL, and prevents static electricity from flowing into the data lines DL.

The ESD circuits 60 may be provided in the second non-display area facing the first non-display area, in addition to the first non-display area. That is, the ESD circuit 600 may be coupled to the data lines formed in the first and second non-display areas 110 and 120.

Hereinafter, a configuration and an operation of the ESD circuit 600 will be described in detail with reference to FIGS. 5 to 8.

Figure 5:
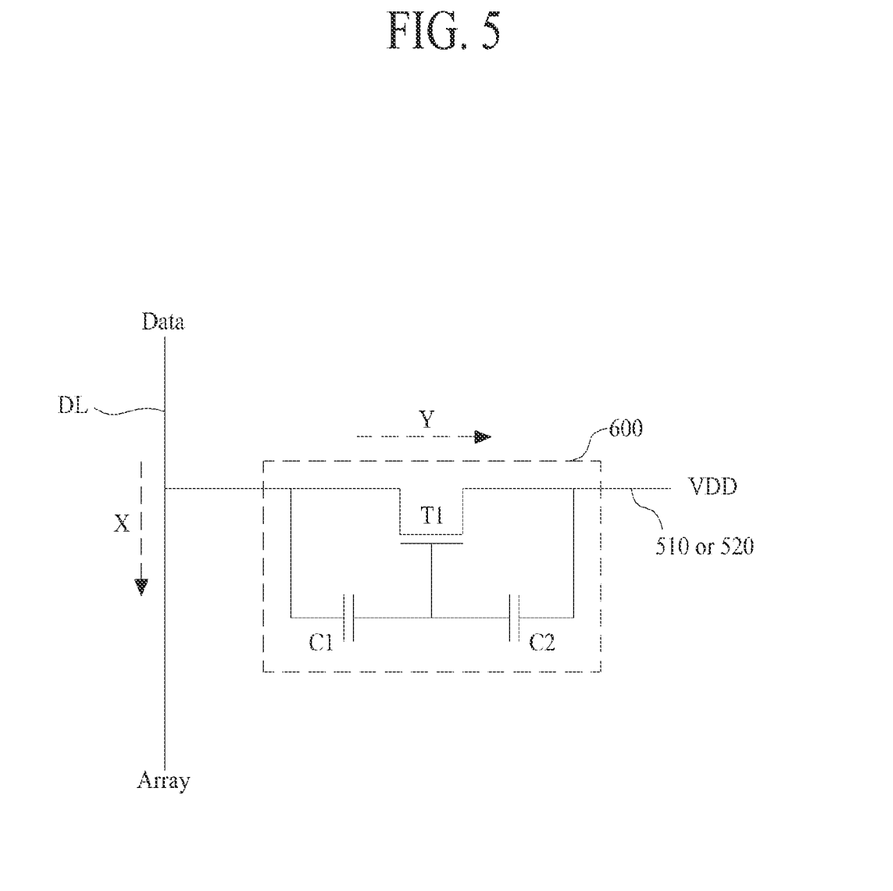
FIG. 5 is a diagram illustrating an equivalent circuit of an ESD circuit applied to the display device according to the present invention.

FIG. 5 is a diagram illustrating an equivalent circuit of the ESD circuit 600 applied to the display device according to the present invention.

The equivalent circuit of the ESD circuit 600 applied to the display device according to the present invention, as illustrated in FIG. 5, may include a TFT T1 that is coupled between the data line DL and the power lines 510 and 520, a first capacitor C1 that is coupled between a gate of the TFT T1 and the data line DL, and a second capacitor C2 that is coupled between the gate of the TFT T1 and the power lines 510 and 520.

In FIG. 5, the power lines 510 and 520 are illustrated as being coupled to the high-level driving voltage VDD terminal, but are not limited thereto. For example, the power lines 510 and 520 may be coupled to one of the high-level driving voltage VDD, the low-level driving voltage VSS, the reference voltage Vref, the gate high voltage VGH, the gate low voltage VGL, and the ground voltage.

When the ESD circuit 600 is used to prevent high-voltage (positive (+)) static electricity from being induced in the data line, the ESD circuit 600 may be coupled to a power line through a high voltage such as the high-level driving voltage VDD or the gate high voltage VGH. When the ESD circuit 600 is used to prevent low-voltage (negative (−)) static electricity from being induced in the data line, the ESD circuit 600 may be coupled to a power line through a low voltage such as the low-level driving voltage VSS, the gate low voltage VGL, or the ground voltage.

An operation of the ESD circuit 600 will now be described briefly.

First, as illustrated in FIG. 5, when a normal data voltage Vdata is applied to a data line DL coupled to the ESD circuit 600, a normal current flows toward the display area (Array) as indicated by an arrow X.

That is, since the normal data voltage Vdata is a direct current (DC) voltage, the normal data voltage Vdata is cut off by the first and second capacitors C1 and C2, and thus, the TFT T1 of the ESD circuit 600 is turned off. To provide an additional description, when the normal data voltage is applied, the data voltage Vdata is insulated from the TFT T1 by the first capacitor C1, and thus, the TFT T1 is maintained in a turn-off state. Therefore, a current does not flow to the ESD circuit 600.

Second, when an abnormal voltage (i.e., static electricity) is applied to the data line DL coupled to the ESD circuit 600, a voltage is generated at a gate node of the TFT T1 by the first capacitor C1. When a capacitance value of the first capacitor C1 is the same that of the second capacitor C2, the voltage generated at the gate node of the TFT T1 is half (½) of the data voltage Vdata, and thus, the TFT T1 is turned on. Accordingly, a current flows (Y) from the data line DL to the power line 510 or 520, and thus, static electricity is discharged through the power line.

That is, when a voltage is rapidly increased or decreased, an alternating current (AC) signal is generated. The TFT T1 is turned on by the AC signal, and thus, static electricity is discharged to the power line 510 or 520 through the ESD circuit 600.

Third, as first described above, when the normal data voltage Vdata is applied to the data line DL, a current should not flow in the ESD circuit 600. However, as described above in the background art, when a threshold voltage of the TFT is changed due to deterioration of the TFT and the other causes, despite the normal data voltage Vdata being induced in the data line DL, a leakage current flows through the TFT.

In this case, only when the leakage current is low, a level of a normal current which flows toward the display area through the data line is high, and thus, an image quality of the panel 100 is not degraded.

Current (I)=voltage (V)/resistance (R), and thus, when a resistance value of the TFT T1 included in the ESD circuit 600 increases, an amount of leakage current (I) flowing to the ESD circuit 600 is relatively reduced.

Therefore, in the TFT T1 according to the present invention, the length of the channel through which a current flows is formed narrower than the width of the channel, thereby increasing a resistance value of the channel.

That is, the present invention increases the resistance value of the channel of the TFT T1, and increases a total resistance value of the TFT T1, thereby decreasing the leakage current (I).

Hereinafter, a structure of the TFT T1 will be described in detail with reference to FIGS. 6 and 7.

Figure 6:
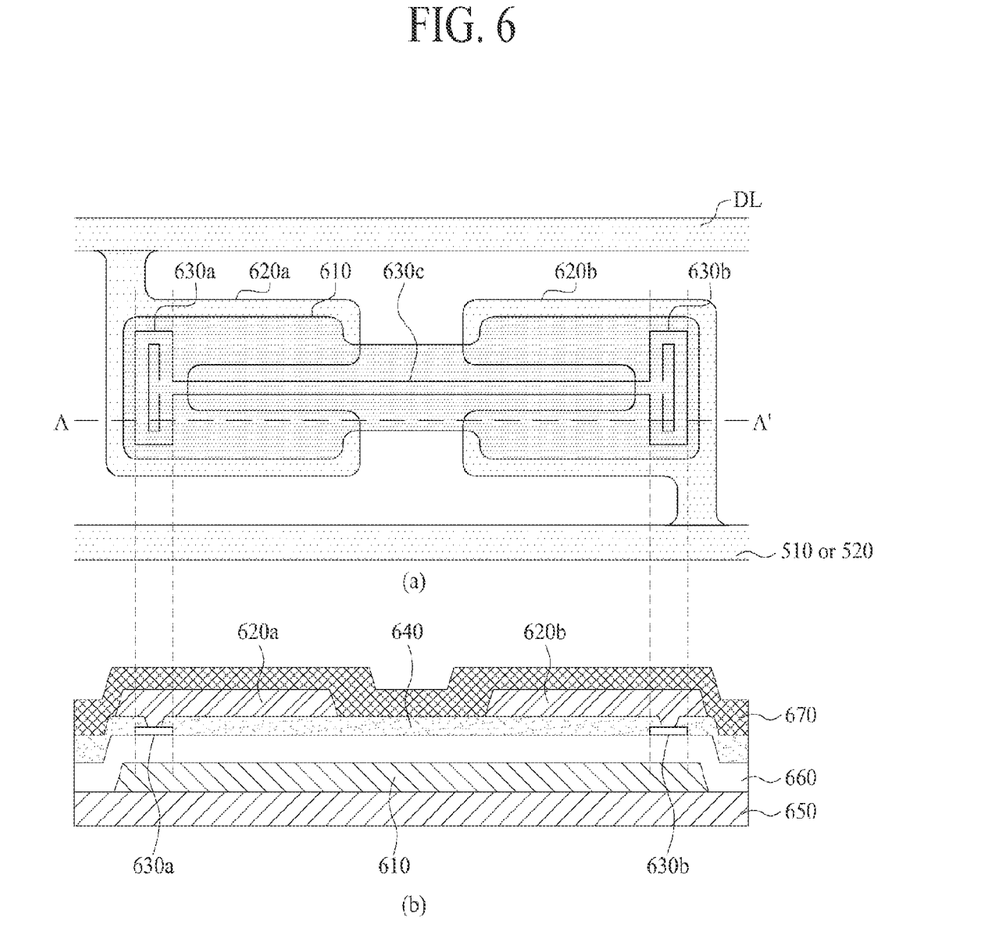
FIG. 6 illustrates a first plan view and a first cross-sectional view of the ESD circuit applied to the display device according to the present invention.

FIG. 6 illustrates a first plan view and a first cross-sectional view of the ESD circuit applied to the display device according to the present invention, a portion (a) of FIG. 6 being the first plan view, and a portion (b) of FIG. 6 being the first cross-sectional view taken along line A-A' of a plane illustrated in the portion (a). FIG. 7 illustrates a second plan view and a second cross-sectional view of the ESD circuit applied to the display device according to the present invention, a portion (a) of FIG. 7 being the second plan view, and a portion (b) of FIG. 7 being the second cross-sectional view taken along line B-B' of a plane illustrated in the portion (a). FIG. 8 is a graph showing an electrical characteristic of the TFT configuring the ESD circuit included in the display device according to the present invention.

Figure 7:
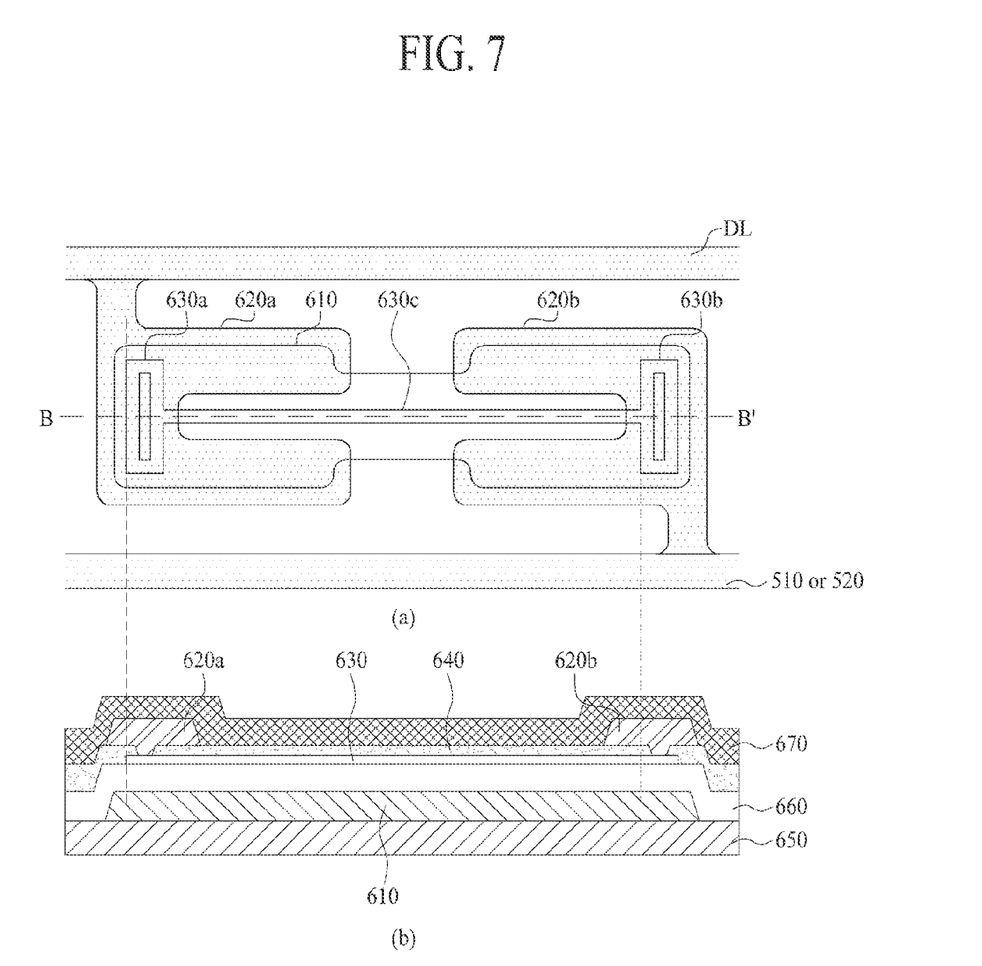
FIG. 7 illustrates a second plan view and a second cross-sectional view of the ESD circuit applied to the display device according to the present invention.
Figure 8:
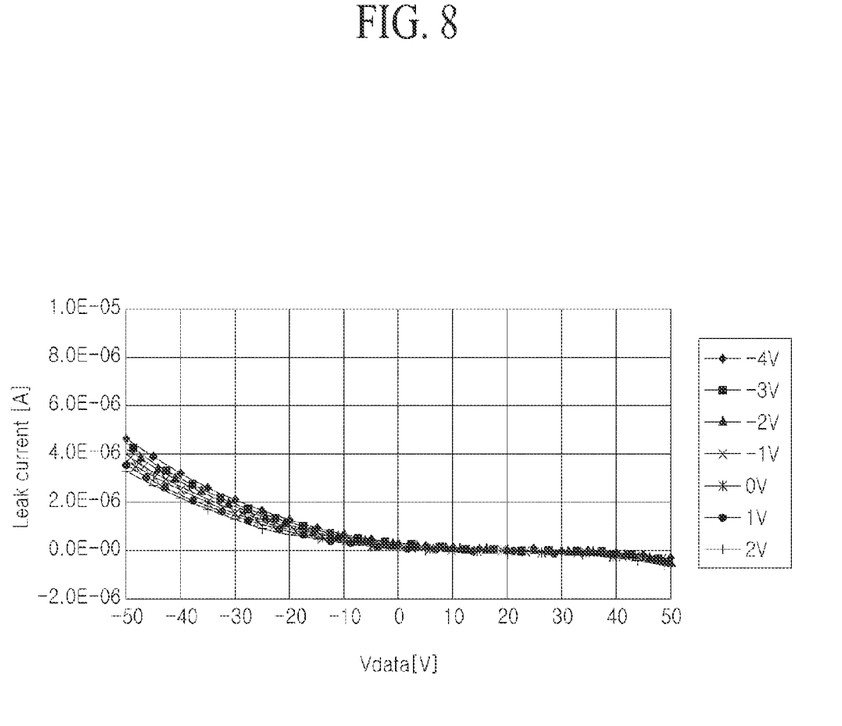
FIG. 8 is a graph showing an electrical characteristic of a TFT configuring the ESD circuit included in the display device according to the present invention.

As illustrated in FIGS. 6 and 7, the TFT T1 of the ESD circuit 600 includes a glass substrate 650, a gate 610 deposited on the glass substrate 650, a gate insulating layer 660 that is deposited on the glass substrate 650 and the gate 610, a channel 630 deposited on the gate insulating layer 660, a channel insulating layer 640 that is deposited on the gate insulating layer 660 and the channel 630, a first terminal 620a that is formed at one side of the channel 630 and on the channel insulating layer 640, and is coupled to the channel 630, and a second terminal 620b that is formed at the other side of the channel 630 and on the channel insulating layer 640 and the first terminal 620a coupled to the channel 630, and is coupled to the channel 630.

Here, each of the first and second terminals 620a and 620b is formed in a U-shape, and particularly, open portions of the U-shape face each other. That is, in order to maximally enlarge a length of the channel 630 in an area with the ESD circuit 600 disposed therein, each of the first and second terminals 620a and 620b is formed in the U-shape. As described above, when each of the first and second terminals 620a and 620b is formed in the U-shape, a capacitance of each of the capacitors C1 and C2 increases.

When the first terminal 620a is coupled to the data line DL, the second terminal 620b is coupled to the power line 510 or 520, and when the second terminal 620b is coupled to the data line DL, the first terminal 620a is coupled to the power line 510 or 520.

That is, when the TFT T1 is coupled between the data line DL and the power line 510 or 520, the power line 510 is coupled to a terminal that supplies one of the high-level driving voltage VDD, the low-level driving voltage VSS, the reference voltage Vref, the gate high voltage VGH, the gate low voltage VGL, and the ground voltage.

The channel 630 includes a first channel terminal 630a that is coupled to the first terminal 620a through a first contact hole formed at the channel insulating layer 640, a second channel terminal 630b that is coupled to the second terminal 620b through a second contact hole formed at the channel insulating layer 640, and a third channel terminal 630c that is coupled between the first and second channel terminals 630a and 630b.

Here, a length of the third channel terminal 630c is formed greater than a width of the third channel terminal 630c, and thus, a resistance value of the channel 630 is high.

A line (i.e., a level of the resistance value of the channel 630) through which a current flows is proportional to a length but is inversely proportional to a width, and thus, as described above, when the channel 630 has a long length and a narrow width, the resistance of the channel 630 increases.

As the resistance of the channel 630 increases, a current flowing through the TFT T1 is reduced, and thus, a level of a leakage current flowing through the TFT T1 is reduced.

A first capacitor is formed between the first terminal 620a and the gate 610 with the channel insulating layer 640 disposed therebetween, and a second capacitor is formed between the second terminal 620b and the gate 610 with the channel insulating layer 640 disposed therebetween. Here, the first capacitor is the first capacitor C1 of FIG. 5, and the second capacitor is the second capacitor C2 of FIG. 5. When AC static electricity occurs in the data line, the first and second capacitors allow a current to flow through the channel 630.

According to the present invention, since a resistance value of the ESD circuit 600 increases, a leakage current flowing through the ESD circuit 600 is reduced.

That is, as shown in FIG. 8, in the ESD circuit 600 applied to the present invention, even when the threshold voltage of the TFT T1 is changed from 2 V to −4 V, it can be seen that an amount of leakage current flowing through the TFT T1 does not greatly increase.

The present invention will now be summarized.

Generally, an ESD circuit is configured with a diode, a TFT, and a capacitor. In the ESD circuit configured with the TFT, a current is leaked according to a shift value of a threshold voltage of the TFT, and when the leakage occurs, loss occurs in outputting a signal.

In order to prevent the loss caused by a leakage current, the length of the channel 630 of the TFT is designed to be large (for example, two or more times greater than a width (W)), and thus prevents the leakage current from occurring. Therefore, despite occurrence of the leakage current, an amount of leakage current is more reduced by a high resistance than the related art.

A length-to-width ratio of the channel 630 may be variously set. For example, the length-to-width ratio of the channel 630 may be 1.5:1 or more. That is, the length of the channel 630 may be 1.5 or more times greater than the width.

The TFT may be formed of oxide semiconductor.

As described above, when static electricity is induced in the data line, the static electricity is removed by inducing the static electricity to the power line. In the normal state where static electricity does not occur in the data line, the present invention reduces leakage of a current applied to the panel through the data line, and thus, the panel can normally display an image.

That is, according to the present invention, since a data current supplied to the data line is not leaked to the ESD circuit, a quality of an image can be prevented from being degraded due to a reduction in a current.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a panel in which a plurality of pixels are respectively formed in a plurality of pixel areas defined by intersections between a plurality of gate lines and a plurality of data lines;
    a source driving IC coupled to the plurality of data lines in a first non-display area of the panel, and configured to respectively supply data voltages to the plurality of data lines; and
    an electrostatic discharge (ESD) circuit in which, to prevent static electricity from flowing into the plurality of data lines, in the first non-display area, an end of one side of the ESD circuit is coupled to a corresponding data line, and an end of the other side is coupled to a power line,
    wherein the ESD circuit comprises a thin film transistor (TFT), and the TFT comprises:
        a glass substrate;
        a gate deposited on the glass substrate;
        a gate insulating layer deposited on the glass substrate;
        the channel deposited on the gate insulating layer;

a channel insulating layer deposited on the gate insulating layer comprising the channel;

a first terminal formed at one side of the channel and on the channel insulating layer, and coupled to the channel; and a second terminal formed at the other side of the channel and on the channel insulating layer, and coupled to the channel, wherein each of the first and second terminals is formed in a U-shape, and open portions of the U-shape face each other, and a length of the channel from the first terminal to the second terminal is 1.5 or more times greater than a width of the channel.

2. The display device of claim 1, wherein, when the first terminal is coupled to a corresponding data line, the second terminal is coupled to the power line, or when the second terminal is coupled to the corresponding data line, the first terminal is coupled to the power line.

3. The display device of claim 1, wherein, a first capacitor is formed between the first terminal and the gate with the channel insulating layer disposed therebetween, and a second capacitor is formed between the second terminal and the gate with the channel insulating layer disposed therebetween.

4. The display device of claim 3, wherein when AC static electricity occurs in the data line, the first and second capacitors allow a current to flow through the channel.

5. The display device of claim 1, wherein the ESD circuit prevents a leakage current from flowing to the ESD circuit in proportion to a resistance value corresponding to the length.

6. The display device of claim 1, wherein the ESD circuit is provided in correspondence with each of the plurality of data lines.

7. The display device of claim 1, wherein the channel comprises:

a first channel terminal coupled to the first terminal through a first contact hole formed at the channel insulating layer;

a second channel terminal coupled to the second terminal through a second contact hole formed at the channel insulating layer; and a third channel terminal coupled between the first and second channel terminals.

8. The display device of claim 7, wherein a length of the third channel terminal is greater than a width of the third channel terminal.

* * * * *